H. H. BUFFUM.
DRIVE MECHANISM.
APPLICATION FILED JUNE 10, 1914.
1,158,027.
Patented Oct. 26, 1915.
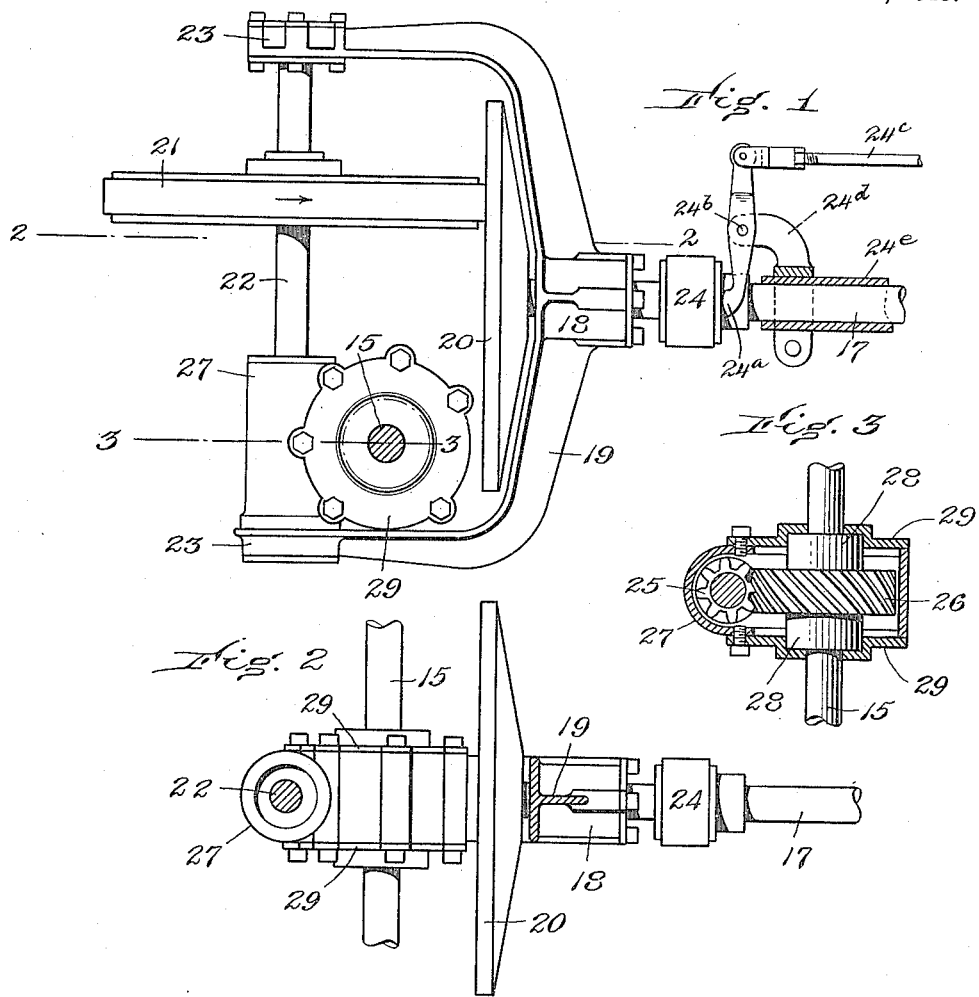
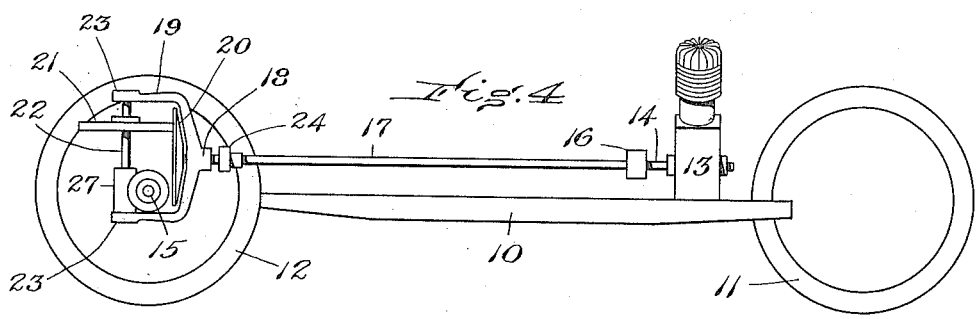

UNITED STATES PATENT OFFICE.

HERBERT H. BUFFUM, OF THE WEIRS, NEW HAMPSHIRE.

DRIVE MECHANISM.

1,158,027.

Specification of Letters Patent.

Patented Oct. 26, 1915.

Application filed June 10, 1914. Serial No. 844,205.

*To all whom it may concern:*

Be it known that I, HERBERT H. BUFFUM, a citizen of the United States, and resident of The Weirs, in the county of Belknap and State of New Hampshire, have invented certain new and useful Improvements in Drive Mechanism, of which the following is a specification.

The object of the present invention is to provide improved drive mechanism capable of flexibility, to enable the parts to partake of relative angular movement while in operation.

The invention as illustrated by the accompanying drawings is applied to a motor vehicle, which furnishes a good example of the conditions to be met by the flexibility of the drive mechanism.

On the drawings:—Figure 1 represents a side elevation of the mechanism to which the invention relates. Fig. 2 represents a horizontal section therethrough in the plane indicated by line 2—2 of Fig. 1. Fig. 3 represents a horizontal section through the structure intersected by line 3—3 of Fig. 1. Fig. 4 represents, somewhat conventionally, the wheels and body-supporting frame of a motor vehicle with the present drive mechanism applied thereto for transmitting rotation from the motor to the traction wheels.

The same reference characters indicate the same parts wherever they occur.

Referring first to Fig. 4, the body-supporting frame, indicated at 10, is an element of the running frame, which includes the wheels 11 and 12. This representation of a running frame is conventional, no springs being illustrated for carrying the frame 10; but it is to be assumed that the frame 10 is supported by springs. A motor is indicated at 13, the same being mounted upon the frame 10 and having a shaft 14.

My improved drive mechanism is shown as being arranged to transmit rotation from the shaft 14 to the wheels 12. This figure illustrates only one wheel 12, but it is to be understood that two such wheels may be mounted upon the axle 15. As it is customary to secure the motor as rigidly as may be to the frame 10, and as the frame and motor are movable up and down with relation to the axle 15 in consequence of flexure of the springs which support the frame, a universal joint is usually provided for connecting the motor shaft with the shaft which transmits rotation to the drive mechanism. In accordance with this practice I have indicated conventionally at 16 a universal joint connecting the shaft 14 with the shaft 17. The shaft 17 has a bearing at 18 in a yoke 19. A friction disk 20 is affixed to the shaft 17 and imparts rotation to a friction wheel 21. The wheel 21 is splined upon a transmission shaft 22, the ends of which are journaled in suitable bearings 23, 23, at the extremities of the yoke 19. The shaft 17 is capable of sufficient longitudinal movement to carry the disk 20 to and from contact with the wheel 21, and for this purpose a collar 24 and shipper lever 24$^a$ are provided. The latter is arranged upon a fulcrum stud 24$^b$ and connected by rod 24$^c$ with an actuator (not shown). Stud 24$^b$ is arranged in a bracket 24$^d$, and the latter is clamped upon a sleeve 24$^e$ which is arranged upon the shaft 17.

Rotation is transmitted from the shaft 22 to the axle 15 by a worm 25 and gear 26. (See Fig. 3). The worm and gear are inclosed in a casing 27 which is journaled upon the axle 15. Suitable anti-friction bearings are indicated at 28 in Fig. 3. The casing 27 has detachable side plates 29 which are formed to embrace the bearings 28 and which when removed from the main body of the casing permit assembling and removing the worm gear 26.

From the foregoing description it may be seen that one end of the shaft 17 depends for its support upon the universal joint 16, and the other end depends for its support upon the element 19 which is capable of oscillating about two distinct axes which are at right angles to each other. One of said axes is the axis of shaft 22, and the other is that of the axle 15. The casing 27 is capable of rotative movement about the axle 15 and is likewise capable of rotative movement about the shaft 22, as for example when one end of the axle 15 is moved forward or backward with relation to the other end. As the bearings for the shaft 22 are in the yoke 19, the shaft and casing 27 are free to tip when the axle 15 is inclined, as when one of the wheels 12 is higher than the other. None of the movements to which the mechanism would ordinarily be subjected by inequalities in the road can cause the casing 27 to bind either on the axle 15 or on the shaft 22. The yoke 19 may have lateral angular movement about the shaft 22 in consequence of side sway of the frame 10 as well as angular movement about the axle 15 in consequence of up and down movement of the frame 10.

Although I have not shown any means for adjusting the friction wheel 21 to vary its speed of rotation, it will be understood that the drive mechanism will be provided with means for this purpose. As it is not of special importance in connection with the mounting of the drive mechanism, and as it would tend to obscure the drawings if included, I have omitted it. It may be readily understood, however, that by adjusting the wheel 21 up and down on shaft 22 the speed of the wheel will be varied, and that if it be adjusted below the axis of the disk 20 the direction of rotation will be reversed. The mechanism is designed to permit the wheel to descend below the axis of the disk 20 in order to obtain a reverse drive.

I claim:

1. The combination with a wheel axle, of a journal structure journaled thereon, a transmission shaft journaled in said structure and arranged at right angles to said axle, transmission gearing connecting said shaft and axle, a movable structure supported by said transmission shaft and having two journals coacting with said transmission shaft and having a third journal at right angles to the axis of said two journals, a shaft arranged in said third journal, and transmission gearing connecting said shafts between said two journals.

2. The combination with a driving shaft and a driven shaft arranged to be capable of relative angular axial movement, of a transmission shaft, means arranged to keep the axis of said transmission shaft at right angles relative to said driving shaft, means arranged to keep the axis of said transmission shaft at one angle relative to said driven shaft, coactive gears arranged on said driving shaft and transmission shaft respectively, one of said gears being movable to and from coactive relation with the other, and means arranged to transmit rotation from said transmission shaft to said driven shaft.

3. The combination with two shafts arranged to be capable of relative angular axial movement, of a transmission shaft, means arranged to keep the axis of said transmission shaft at right angles relative to one of said two shafts, means arranged to keep the axis of said transmission shaft at one angle relative to the other one of said two shafts, means arranged to transmit rotation from one of said two shafts to said transmission shaft, and means arranged to transmit rotation from said transmission shaft to the other one of said two shafts, one of said transmitting means being adjustable to vary the speed ratio of its driving and driven elements.

4. Transmission mechanism comprising a shaft, a bearing structure having a bearing embracing said shaft, a second shaft journaled in said bearing structure, coactive friction members arranged respectively on said first and second shafts to transmit rotation from one to the other, a third shaft, means journaled on said second and third shafts for keeping them in one relative position, and coactive gears arranged respectively on said second and third shafts for transmitting rotation from one to the other.

5. The combination with a wheel axle and an angularly movable drive shaft, of universally jointed transmission means arranged to transmit rotation from said shaft to said axle, said transmission means being capable of angular movement in response to angular movement of said axle and shaft and being capable of adjustment to reverse the rotation of said axle relatively to that of said shaft.

6. The combination with a wheel axle, of a gear case journaled thereon, a transmission shaft extending through and journaled in said gear case, the axis of said transmission shaft being transverse with relation to the axis of said axle, coactive helical gears carried by said axle and transmission shaft respectively and arranged in said gear case, a movable structure supported by said transmission shaft and having two journals coacting with said transmission shaft and having a third journal arranged transversely with relation to the axis of said two journals, said gear case being between said two journals, a friction gear carried by said transmission shaft between said two journals, a drive shaft arranged in said third journal, and a friction gear carried by said drive shaft, said friction gears being arranged to coact.

7. The combination with a vehicle having a live wheel axle and a body frame movable up and down relatively to said axle, of a journal structure journaled on said axle, a transmission shaft journaled in and supported by said journal structure at right angles to said axle, gearing arranged to transmit rotation from said transmission shaft to said axle, a movable structure journaled on and supported by said transmission shaft, a drive shaft journaled in said movable structure at right angles to said transmission shaft, gearing arranged to transmit rotation from said drive shaft to said transmission shaft, power means carried by said body frame, and a universal joint supported by said power means and fastened to said drive shaft to transmit rotation to the latter.

In testimony whereof I have affixed my signature, in presence of two witnesses.

HERBERT H. BUFFUM.

Witnesses:
WILLIAM F. KNIGHT,
C. W. TYLER.